March 26, 1968     L. DEKKER ET AL     3,375,357

AUTOMATIC SUBTRACTING DEVICE

Filed Oct. 22, 1965     7 Sheets-Sheet 1

INVENTORS
LAUNCELOT DEKKER
LEROY J. RYAN JR.
BY

ATTORNEYS

FIG. 5

March 26, 1968  L. DEKKER ET AL  3,375,357
AUTOMATIC SUBTRACTING DEVICE
Filed Oct. 22, 1965

INVENTORS
LAUNCELOT DEKKER
LEROY J. RYAN JR
BY
ATTORNEYS

March 26, 1968   L. DEKKER ET AL   3,375,357
AUTOMATIC SUBTRACTING DEVICE
Filed Oct. 22, 1965   7 Sheets-Sheet 5

INVENTORS
LAUNCELOT DEKKER
LEROY J. RYAN JR.
BY
*Mazzell, Johnston, Cook & Root*
ATTORNEYS March 26, 1968     L. DEKKER ET AL     3,375,357
AUTOMATIC SUBTRACTING DEVICE
Filed Oct. 22, 1965     7 Sheets-Sheet 7

INVENTORS
LAUNCELOT DEKKER
LEROY J. RYAN JR.
BY
ATTORNEYS

United States Patent Office 3,375,357
Patented Mar. 26, 1968

3,375,357
AUTOMATIC SUBTRACTING DEVICE
Launcelot Dekker, La Porte, Ind., and LeRoy J. Ryan, Jr., Chicago, Ill., assignors to Maatschappij van Berkel's Patent N.V., Leidschendam, Netherlands, a limited-liability company of the Netherlands
Filed Oct. 22, 1965, Ser. No. 500,728
20 Claims. (Cl. 235—174)

ABSTRACT OF THE DISCLOSURE

An electronic automatic subtracting device receiving subtrahend and minuend decimal figures and delivering at the output side the remainder in decimal figures including means for converting the figures to the BCD code and inverting same to the 9-complement, forcing net and gross counters to the count of the inverted figures, pulsing the counters once to convert the figures to the 10-complement, and pulsing the counters until the gross counter resets to zero, thereby leaving the difference in the net counter.

---

This invention relates in general to an automatic subtracting device, and more particularly to an electronic automatic subtracting device capable of receiving at the input side a subtrahend and a minuend and delivering at the output side the remainder, and still more particularly to an automatic subtracting device that is especially adaptable for use with weighing devices wherein the gross weight and tare weight of the container are received by the device at the input side and the net weight is delivered from the output side, although other uses and purposes of the invention will be apparent to those skilled in the art.

The automatic subtracting device of the invention employs the principle of subtraction by means of adding with the help of the 9- and 10-complements of a figure, wherein the maximum capacity is the four decade figure 9999, although any one or more of the decades may be omitted. While the device of the present invention may be applied to any weighing device where it is desired to obtain the subtraction of a tare weight from a gross weight for determining the net weight of a product, the device may be employed in any other area wherein a remainder figure is obtained by the subtraction of one figure from another figure.

In one form of the present invention where a subtraction operation is to be performed, a subtrahend is delivered to an inverter and converter in decimal form which substantially simultaneously inverts the subtrahend to the 9-complement and converts it to the binary coded decimal code (BCD code). The binary output is then delivered to a presetter or a preset circuit that functions to preset a group of net counters accordingly. Similarly, the minuend is then delivered to an inverter and converter for inverting same to the 9-complement and converting it to the BCD code, and into a presetter or preset circuit that presets a group of gross counters. Both the net and gross counters are binary and the unit digit or the digit of the lowest order in each of the counters is pulsed to convert the 9-complement figures into 10-complement figures. A pulse oscillator then operates to pulse both counters until the gross counter reaches the zero position and signals the oscillator to stop, thereby leaving in the net counter the difference between the minuend and subtrahend which constitutes the remainder. Suitable read-out means may be provided for reading the net counter.

Where it may be desired to retain in memory the subtrahend for subsequent subtraction operations, and/or retain in memory the remainder as taken from the net counter, suitable memory circuitry may be employed.

More specifically, to transfer the subtrahend to the net counter, a converter or BCD matrix would be employed to convert the decimal input to a binary output for operation of memory drivers that amplify the signal and deliver it to a subtrahend memory circuit from which it is taken in decimal form into the inverter and converter above described. As in the preceding embodiment, the output of the inverter and converter is delivered to a presetter that presets the net counter. The flow pattern for the minuend remains the same as the above embodiment. A net memory circuit is provided to receive the output of the net counter and hold same. The net memory is erased upon subsequent operations of the device, while the subtrahend is retained until an erase signal is given, which might be given also after an undetermined number of weighings, depending upon requirements.

When the subtracting device of the present invention is employed with weighing devices, both of the above embodiments would provide the tare weight to be introduced into the net counter and the gross weight to be introduced into the gross counter, wherein after the pulsing operations, the net weight remains in the net counter for readout purposes. Tare weight may be manually introduced during each weighing operation, by weighing the tare weight on the same scale as is used for weighing the gross weight and thus introducing the tare weight automatically into the subtracting device, or by introducing it through programing if so desired.

Therefore, it is an object of the present invention to provide a new and improved automatic subtracting device.

A further object of this invention resides in providing an automatic electronic subtracting device that obtains a subtraction operation by converting the figures into their 9- and 10-complements thereof and employing the step of addition.

Still another object of this invention is in the provision of an automatic subtraction device capable of absorbing a subtrahend and a minuend, inverting same to the 9-complement and delivering the 9-complements to respective binary counters, converting the 9-complement figures in the counters to 10-complement figures, pulsing the counters until the minuend counter resets to 0 and thereby leaving the remainder figure in the subtrahend counter for readout purposes.

A further object of this invention is to provide an automatic subtracting device that may be employed with weighing devices for automatically subtracting tare weight from gross weight to obtain net weight.

Other objects, features and advantages of the invention will be apparent from the following detailed disclosure, taken in conjunction with the accompanying sheets of drawings, wherein like reference numerals refer to like parts, in which.

Figure 1:
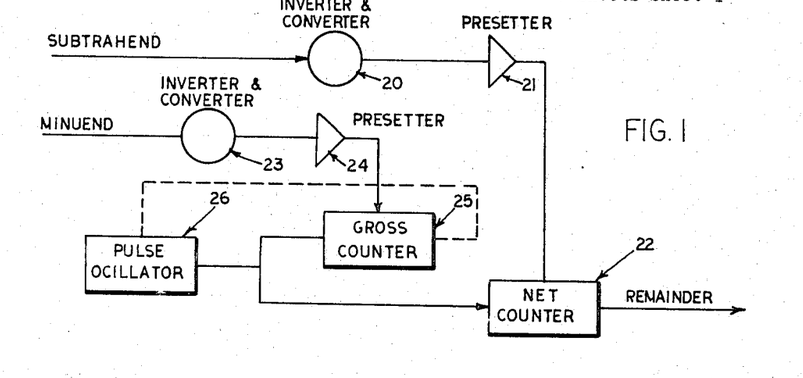
FIG. 1 is a block diagram of one embodiment of the invention.
Figure 2:
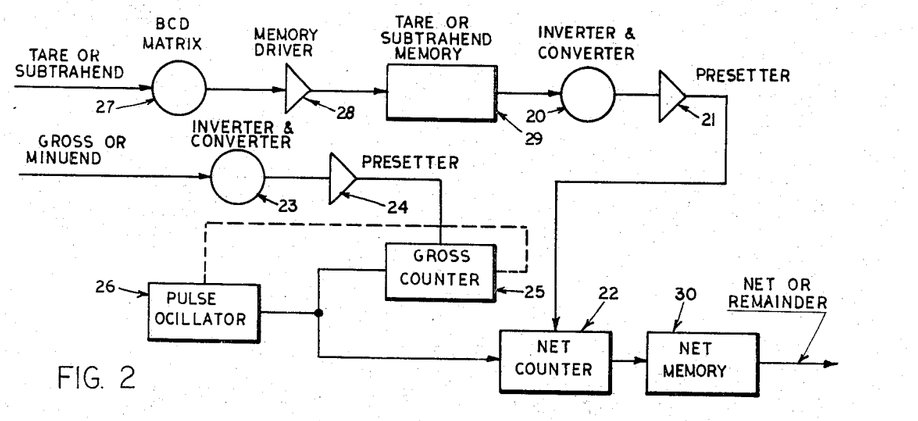
FIG. 2 is a block diagram of another embodiment of the invention.

The automatic subtracting device of the invention is illustrated in block diagram in one form in FIG. 1 and in another form in FIG. 2, the latter differing from the first primary in that memory circuitry is added for the tare or subtrahend and net outputs. While the present invention will be hereinafter referred to many times as applying to a weighing device for subtracting tare from gross weight, it should be appreciated that the invention may be employed for subtracting one figure from another figure whether involved with weighing or some other operation. Moreover, the device of the present invention will be set forth as capable of receiving decimal inputs and capable of delivering decimal outputs.

The maximum capacity of the device of the present invention is a four column or digit figure (9999), but the decimal point may be placed at any point along the figure, and one or more of the digits may be added or omitted if so desired.

Reference will be continually made hereinafter to certain terms, and for clarity purposes, a definition of these terms will be given as follows:

Figure—A number of ciphers arranged together from a figure, e.g. 3684.

Decade—This represents the position of a cipher in a figure, e.g., with respect to the above figure the 4 is located in the $10^0$ decade, the 8 is located in the $10^1$ decade, the 6 is located in the $10^2$ decade and the 3 is located in the $10^3$ decade. The $10^0$ is considered to be of the lowest order.

Digit—A decade consists of ten digits, e.g., 0, 1, 2, 3, 4, 5, 6, 7, 8 and 9. Thus, in the figure 3684, the cipher 8 is the digit 8 in the $10^1$ decade.

BCD Code—This represents binary coded decimals and is also defined as the 1, 2, 4, 8 binary code. It consists of four bits which can form any digit in a decade as follows:

| | |
|---|---|
| 0=0 (is nothing) | 5=1+4 |
| 1=1 | 6=2+4 |
| 2=2 | 7=1+2+4 |
| 3=1+2 | 8=8 |
| 4=4 | 9=1+8 |

9-complement—The inversion of the digit 9. The 9-complement of a digit added thereto equals 9. Examples are as follows:

| Original Digit | | 9-complement | Original Figure | 9-complement |
|---|---|---|---|---|
| 0 | = | 9 | 3684 | 6315 |
| 1 | = | 8 | | |
| 2 | = | 7 | | |
| 3 | = | 6 | | |
| 4 | = | 5 | | |
| 5 | = | 4 | | |
| 6 | = | 3 | | |
| 7 | = | 2 | | |
| 8 | = | 1 | | |
| 9 | = | 0 | | |

10 complement—The inversion of the digit 10. The 10-complement of a digit added thereto equals 10. Thus, the 10-complement of a four digit figure is 10,000. Examples are as follows:

| Original Digit | | 10-complement | Original Figure | 10-complement |
|---|---|---|---|---|
| 0 | = | 0 (really 10) | 3684 | 6316 |
| 1 | = | 9 | | |
| 2 | = | 8 | | |
| 3 | = | 7 | | |
| 4 | = | 6 | | |
| 5 | = | 5 | | |
| 6 | = | 4 | | |
| 7 | = | 3 | | |
| 8 | = | 2 | | |
| 9 | = | 1 | | |

The term subtrahend compares to tare weight, while the term minuend compares to gross weight, and the term remainder compares to net weight with respect to further description of the invention.

Referring now to the embodiment of FIG. 1 and an operation where it is desired to substract one decimal value from another decimal value, the subtrahend or tare weight is delivered in decimal form to the inverter and converter 20 which inverts the figure to the 9-complement and converts it to the BCD code. The subtrahend is then delivered to the presetter or preset circuit 21 which functions to preset the net counters 22 accordingly. The net counters are in the form of binary counters, but the presetter forces the counters into position for the figure transmitted. The minuend or gross weight is similarly delivered in decimal form to an inverter and converter 23 which similarly delivers in binary form to the presetter or preset circuit 24 which similarly presets the gross counters 25.

It will be appreciated that the gross counters will always have a figure lower than the net counters. Through a programing circuit, one pulse is given to the $10^0$ decade of the net and gross counters to convert the figure from the 9-complement to the 10-complement. Thereafter the counters are simultaneously pulsed by a pulse oscillator 26 until the gross counters 25 reset to 0 and stop the pulse oscillator. Thus, by converting the original figures to the 9-complement, setting the binary counters, converting the 9-complement to the 10-complement, and adding to the counters until the gross counters reset to 0, the remainder or net weight can be read out of the net counters 22. For example, if the subtrahend figure is 42, the 9-complement thereof delivered to the net counters would be 57, and the minuend would be 63, the 9-complement thereof delivered to the gross counters would be 36. Thereafter by adding one pulse to each of the counters, the gross counter would read 37 while the net counters would read 58. Pulsing of the gross counters until it resets to 0 would demand 63 pulses and would carry the net counters through 0 and to 21 which would be the remainder and could be read out. Thus, the net counters will pass the 0 or reset position and stop in the position equal to the remainder or net weight.

The embodiment of FIG. 2 differs only in that the tare weight or subtrahend circuitry includes memory circuitry for holding the tare weight or subtrahend figure until a subsequent operation of the device involving a different tare or subtrahend would be employed. In this arrangement, the tare weight or subtrahend is delivered in decimal form to a BCD matrix 27 which converts the decimal input to a binary output and delivers same to a memory driver circuit 28. The memory driver circuit delivers to the tare or subtrahend memory 29 that retains the tare or subtrahend figure until a different tare or subtrahend figure is delivered thereto. The output of the tare or subtrahend memory is in decimal form and delivered to the inverter and converter 20 and on to the presetter 21 and the net counters 22 in the manner of the embodiment of FIG. 1. At any time, the tare or subtrahend can be read out of the memory 29. Additionally, the embodiment of FIG. 2 further provides a net memory 30 that receives the output of the net counters 22 and holds same until a different output is submitted thereto. Thus, the output of the net memory can be read at any time.

Figure 3:
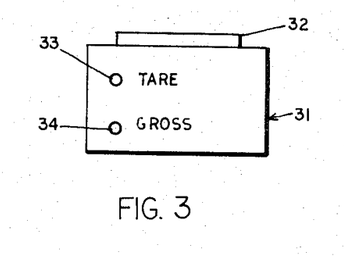
FIG. 3 is a diagrammatic illustration of a weighing device employing the present invention.

As above explained, the present invention may be applied with respect to weighing devices. A weighing device 31 is illustrated in FIG. 3 and provided with a weighing platform 32. A tare button 33 and a gross button 34 serve to operate the circuitry of the automatic substracting device, wherein a container or tray may be placed upon the weighing platform 32 and the weight thereof absorbed into the substracting device by pressing of the button 33. Thereafter, the product in the container or tray may be placed upon the weighing platform 32 and upon pressing of the gross button 34, the automatic subtracting device will operate to subtract the tare weight from the gross weight and give the net weight.

Figure 4:
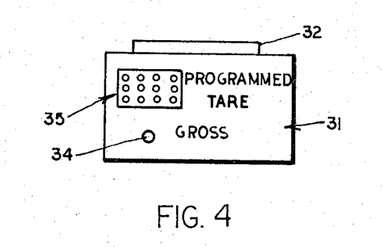
FIG. 4 is a diagrammatic view of a modified weighing device employing the invention.

It should also be appreciated that the tare may be preset or programed without requiring the necessity of placing a container on the weighing platform, and such is diagrammatically illustrated in FIG. 4 wherein a programed tare control box 35 is provided on the weighing device with a plurality of pushbuttons, each of which represents a particular tare weight and which the operator can select from depending upon the product and container being weighed. Any type of selectors may be employed other than pushbuttons, including rotary switches, data processing cards, tapes and the like. In this embodiment, the same procedure would be followed wherein the tare would be impressed in the subtracting device followed by the gross weight to determine the net weight of the product.

Figure 5:
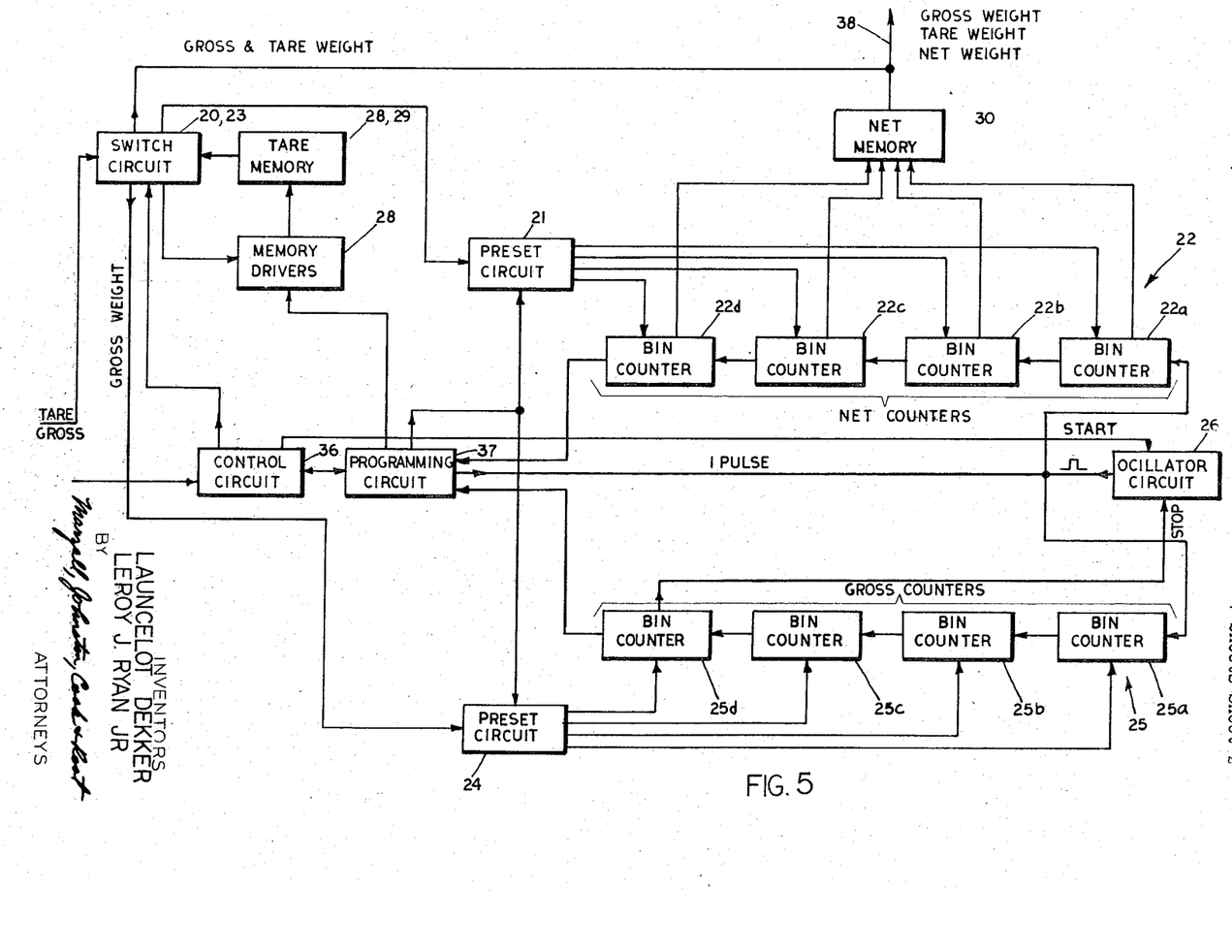
FIG. 5 is a block diagram of the embodiment of FIG. 2 showing more detail.

Referring now to FIG. 5, a flow diagram of the operation of the embodiment of FIG. 2 is shown, wherein the tare and gross start signals are given to the control circuit 36 which triggers operation of a programing circuit 37 that sequences the settings of the tare memory and all counters. It also sets all counters to zero when a new substraction has to be made and furthermore it cancels any substraction where the net is larger than the gross, after which it will set all counters to zero. The control circuit sequences the entire operation of the device and may also be employed for triggering the operation of a computer, printer or any other module employed in the overall system. Since neither the control circuit nor the programming circuit constitutes a part of this invention, they will not be described in detail. It may be noted that the net counters include binary counters $22a$, $22b$, $22c$ and $22d$, one for each decade, and respectively for the decades $10^0$, $10^1$, $10^2$ and $10^3$. Similarly, the gross counters 25 include binary counters $25a$, $25b$, $25c$ and $25d$. Readouts of the gross, tare and net weights can be made at 38.

Figure 6:
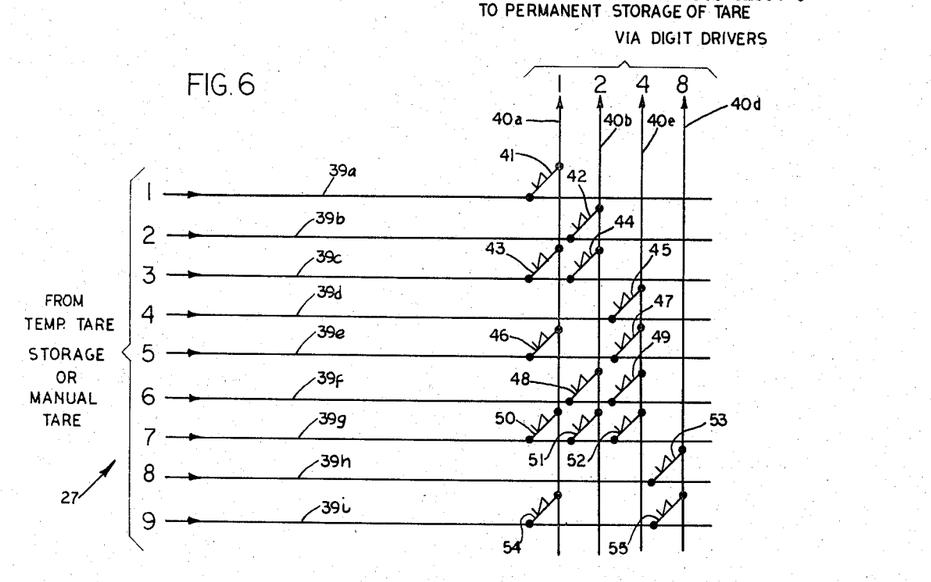
FIG. 6 is a schematic diagram of the BCD matrix employed in the present invention.

The BCD matrix 27 serves to convert a decimal value to a binary value, and as shown in FIG. 6 includes circuitry having input lines $39a$, $39b$, $39c$, $39d$, $39e$, $39f$, $39g$, $39h$ and $39i$ corresponding respectively to the digits 1 through 9. Output lines $40a$, $40b$, $40c$ and $40d$ correspond respectively to the four binary bits 1, 2, 4 and 8, and are connected to the memory circuitry 29 through the drivers 28. The input line $39a$ is connected by a diode line 41 to the output line $40a$ wherein a decimal signal coming in on line $39a$ will be read at the binary output line $40a$ as the digit 1. Similarly, a diode connecting line 42 extends between the input line $39b$ and the output line $40b$ for the digit 2. Diode connecting lines 43 and 44 connect the input line $39c$ to the output lines $40a$ and $40b$ for the digit 3. The digit 4 goes in on line $39d$ and which is connected to line $40c$ by a diode connecting line 45. Diode connecting lines 46 and 47 connect the input line $39e$ of the digit 5 to the output lines $40a$ and $40c$ for the binary bits 1 and 4. The digit 6 comes in on input line $49f$ and is converted to the binary bits 2 and 4 of lines $40b$ and $40c$ by the diode connecting lines 48 and 49. The input line $39g$ for the digit 7 is interconnected with output binary lines $40a$, $40b$ and $40c$ by diode connecting lines 50, 51 and 52. A diode connecting line 53 connects the input line $39h$ to the output binary bit line $40d$ for the digit 8. The digit 9 is converted to the binary bits 1 and 8, wherein the input line $39i$ is connected to the output lines $40a$ and $40d$ by the diode connecting lines 54 and 55. The subtrahend or tare value is received on the input lines, manually or by programing, and thereby converted to the BCD code by the matrix 27. This matrix is shared by all decades which go in serially from the lowest to the highest order. Thus, the decade $10^0$ would be first and thereafter followed by the decades $10^1$, $10^2$ and $10^3$.

The memory drivers 28 comprise circuitry that serves as a combination amplifier and shift register, wherein each digit is placed into the proper decade. These drivers serve to energize one or more relays in the tare memory circuit. Although this circuitry forms no part of the invention, it will be understood that it includes four decade drivers, one for each decade, and sixteen digit drivers, four for each decade. The output is in four decades in binary form. Thus, the input to the tare or subtrahend memory 29 is in binary form.

Figure 7:
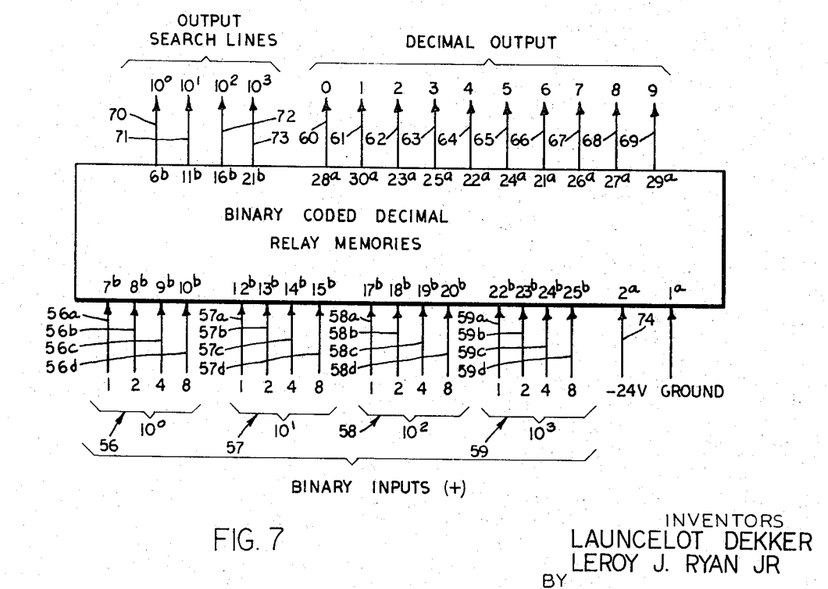
FIG. 7 is a schematic diagram, partially in block form, of the memory circuitry employed in the present invention.
Figure 8:
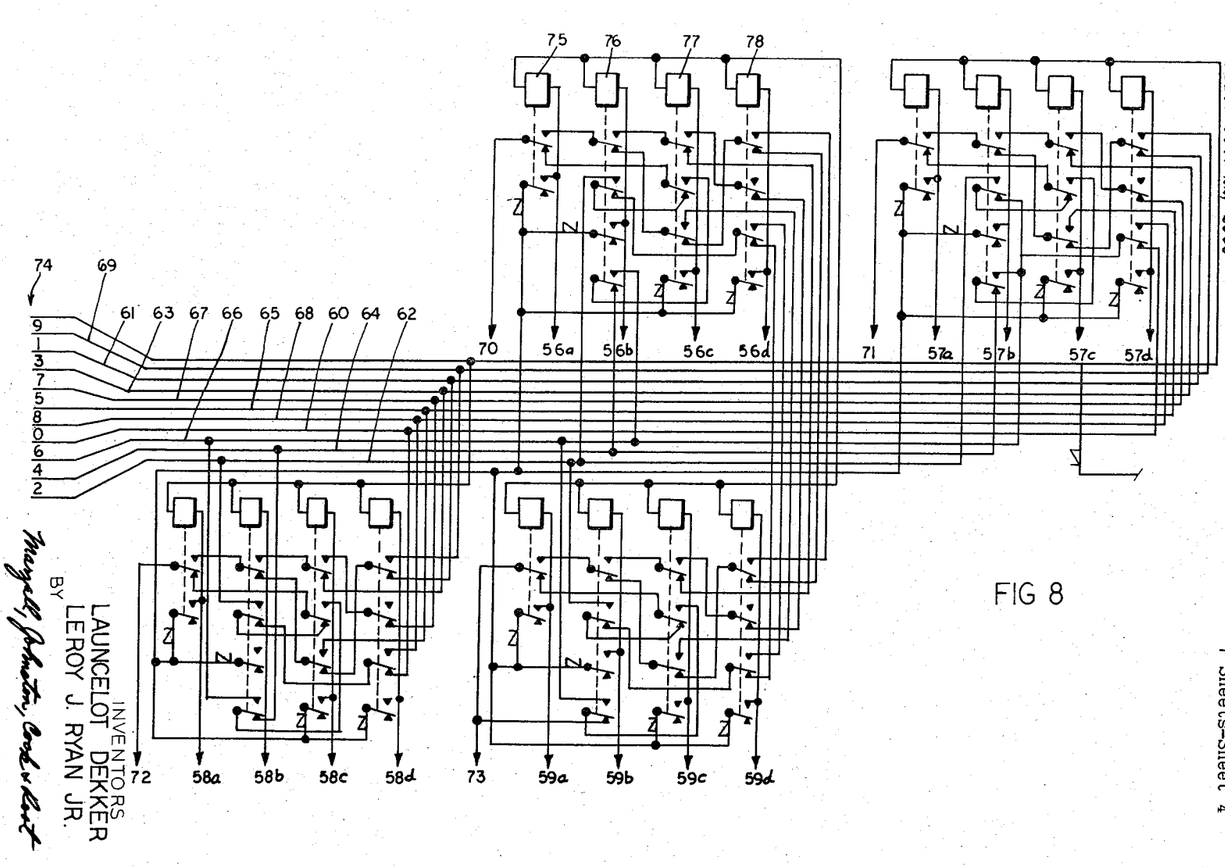
FIG. 8 is an electrical schematic diagram of the memory circuits of the present invention showing more detail than in FIG. 7.

The tare memory circuitry 29 and the net memory circuitry 30 are identical although arranged in different portions of the circuit, and therefore only one will be described in detail. For purposes of clarity, the memory circuitry will be referred to as the tare memory 29 and reference is hereinafter made to FIGS. 7 and 8. The memory circuitry includes binary inputs 56, 57, 58 and 59 for the decades $10^0$, $10^1$, $10^2$ and $10^3$, respectively, each of which includes binary bit lines 1, 2, 4 and 8 that are respectively indicated by the suffix letters $a$, $b$, $c$ and $d$. The output is in decimal form at the output lines 60 to 69, inclusive, which respectively represent the digits 0 to 9. Output search lines 70, 71, 72 and 73, respectively, for the decades $10^0$, $10^1$, $10^2$ and $10^3$ are also provided. As seen in FIG. 8, each decade is provided with four switching relays which when actuated are held in position by the relay hold line 74 until subsequently erased by another input operation. An example of operation would be to refer to the relays for the circuit for the decade $10^0$, wherein the digit 6 would be brought in on the binary bit lines $56b$ and $56c$ to energize relays 76 and 77 of the relays 75 to 78, thereby permitting an output along output line 66. Thus, the memory circuits receive a binary input and deliver a decimal output.

As already explained, if there is no retention of tare needed, the BCD matrix 27, memory driver 28 and tare or subtrahend memory 29 may be omitted. The output of the tare memory 29 is in decimal form and the decades are discharged serially into the inverter and converter 20.

Figure 9:
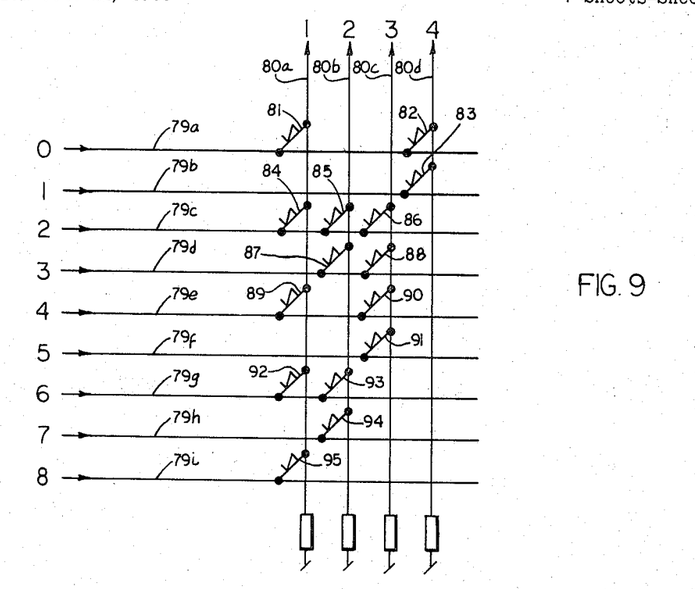
FIG. 9 is an electrical schematic diagram of the inverter and converter of the present invention which inverts a decimal input to the 9-complement and converting same to the BCD code.

The inverter and converter 20 inverts the decimal input to the 9-complement and converts it to binary form for the presetter 21. The inverting and matrix circuitry is shown in FIG. 9 wherein the decimal input lines are designated $79a$ to $79i$, and the output binary bit lines are designated $80a$, $80b$, $80c$ and $80d$ for the binary bits 1, 2, 4 and 8, respectively. The input lines $79a$ to $79i$ represent the input digits 0 to 8, respectively. The purpose of the inverter and converter is to give the 9-complement in binary form to the presetter 21. Only a single matrix is needed for the preset circuit 21 since all four decades and the sixteen digit drivers share the same matrix. The digit 9 input is omitted since the 9-complement thereof in the BCD code is 0, which is nothing (no signal). Diode connecting lines 81 and 82 connect the input line $79a$ of the digit 0 to the output binary bit lines $80a$ and $80d$ inasmuch as the 9-complement of 0 is 9. The diode connecting line 83 connects the input line $79b$ with the output line $80d$, while diode connecting lines 84, 85 and 86 interconnect the input line $79c$ with the binary bit output lines $80a$, $80b$ and $80c$. Diode connecting lines 87 and 88 interconnect the input line $79d$ with the output binary lines $80b$ and $80c$, while diode connecting lines 89 and 90 interconnect the input line $79e$ with the output line $80a$ and $80c$. The input decimal line $79f$ is connected to the output binary line $80c$ by diode connecting line 91, while the input line $79g$ is connected to the output lines $80a$ and $80b$ by diode connecting lines 92 and 93. A diode connecting line 94 interconnects the input line 79h with the output line 80b, while the input line 79i is connected to the output line 80a by the diode connecting line 95. The output of the inverter and converter 20 is in serial form with the lowest order decade first followed by the next highest order decades.

Figure 10:
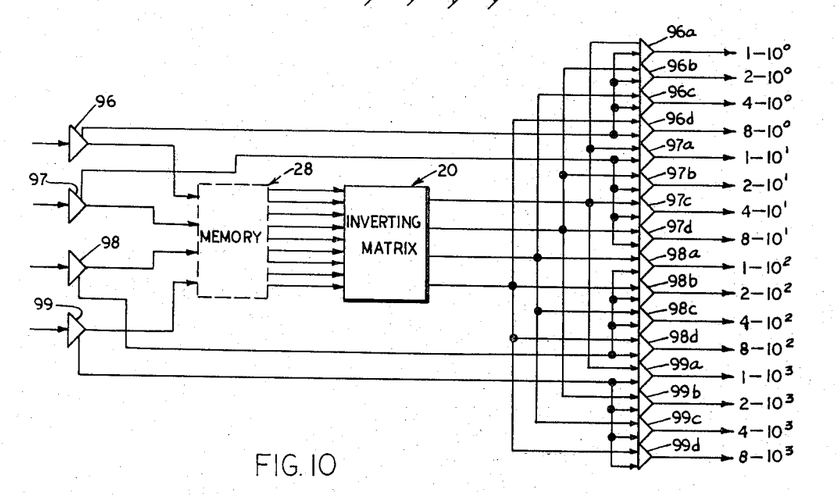
FIG. 10 is an electrical schematic, somewhat diagrammatic, of the presetter or counter preset circuitry of the present invention.

The preset circuit or presetter 21 places each digit in the proper decade and serves to preset the net counters 22. The presetter 24 operates in the same manner and is provided with the same circuitry as the presetter 21 for presetting the counters in the gross counters 25. The presetter is shown in more detail in FIG. 10 wherein decade drivers 96, 97, 98 and 99 for the decades $10^0$, $10^1$, $10^2$ and $10^3$, respectively, are shown for operating digit drivers, four for each decade and indicated by the numbers of the decade plus the suffixes a, b, c and d for the binary bits 1, 2, 4 and 8. Each digit driver is provided with two inputs, one from the corresponding decade driver and the other from the inverter and converter 20, and both of the inputs must be energized before there is an output from the digit driver. The decade driver selects the decade, while the digit driver selects the particular digit. The binary bits lead to the counters of the net counters 22 for the presetter 21 and of the gross counters 25 for the gross presetter 24.

Figure 11:
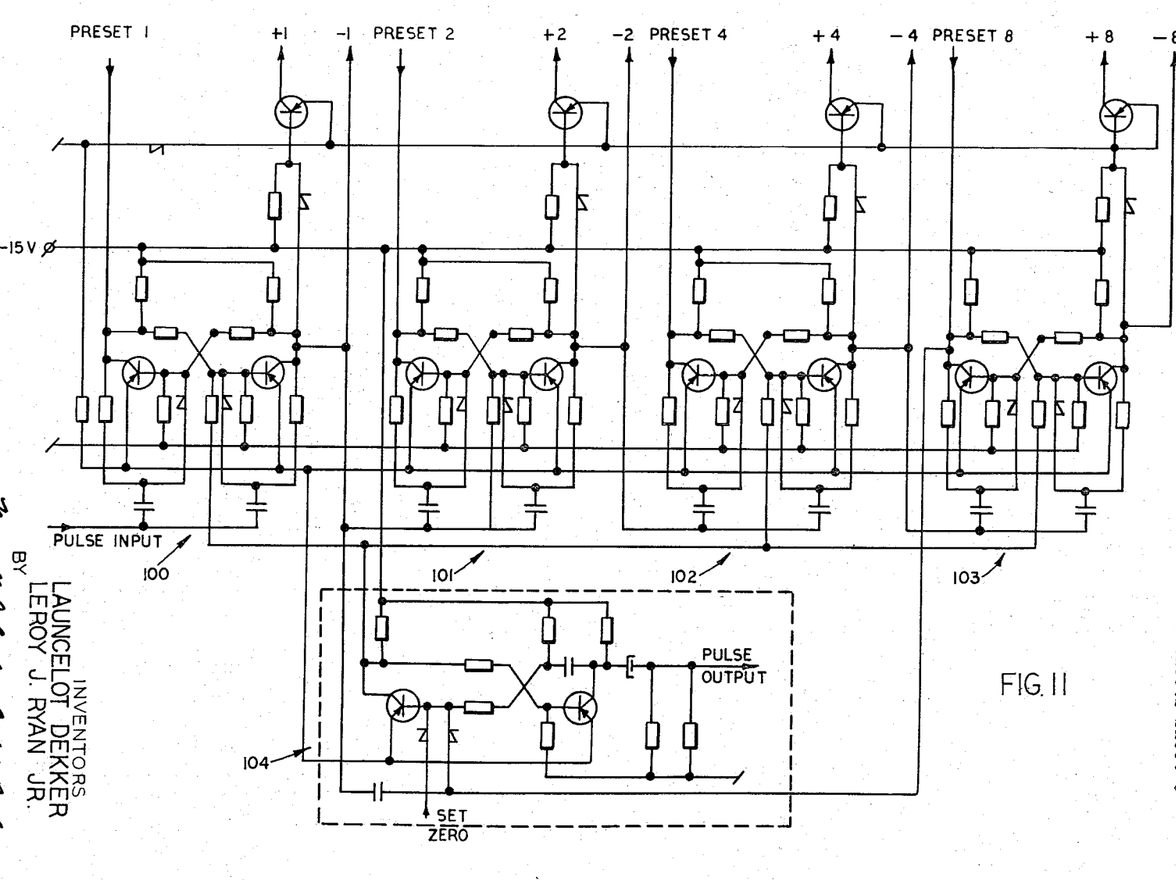
FIG. 11 is an electrical schematic of a binary counter representing one decade in a counter of the present invention.
Figure 12:
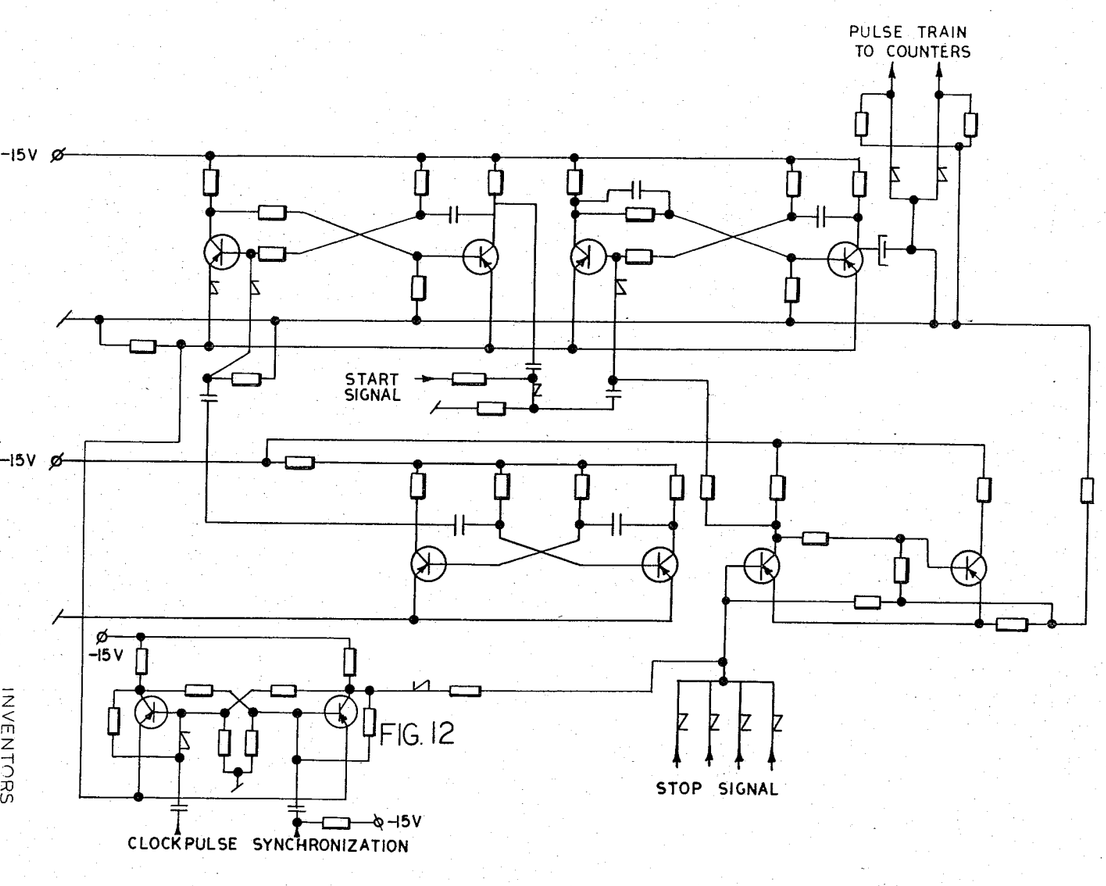
FIG. 12 is an electrical schematic of the pulse oscillator of the present invention.

The circuitry of the net counters 22 is the same as the circuitry of the gross counters 25, except that the net counters have positive voltage outputs and the gross counters have negative voltage outputs, and the net counters will therefore be explained in detail with reference to FIG. 11. The circuitry of FIG. 11 represents the counter for one decade, and therefore there are four such circuits in the net counters. Assuming this is the circuit for the decade $10^0$, it includes four flip-flops 100, 101, 102 and 103, and a reset circuit 104. This circuitry would be of the standard binary counter circuitry normally capable of counting to 10 and then resetting by pulsing, and would be interconnected with the digit drivers of the $10^0$ decade so that it could be forced into the count position as dictated by the binary bit input lines. Thereafter when it would be pulsed to the 10 count position, it would automatically be reset to 0 by the reset circuit 104. As heretofore explained, the 9-complement of the figure would be introduced to the net counters 22, and thereafter the $10^0$ decade would be pulsed once to convert the figure to that of the 10-complement. The programming circuit would then start the pulse oscillator of FIG. 12 to simultaneously pulse the gross counters and net counters until the gross counters reset to 0. The pulse oscillator would be stopped when the gross counters have been reset to 0, thereby leaving the net or remainder figure in the net counters. Simultaneously, when the pulse oscillator is turned off by the gross counters, the $10^3$ gross counter signals back to the control circuit to indicate that the subtraction operation has been completed so that the control circuit can then send a signal to the net memory 30 to absorb the count on the net counters. The output of the net counters is in binary form and converted to decimal form by the net memory in the manner heretofore explained in connection with the tare memory 29. Thereafter the control circuit can send a signal to the next module that the subtraction operation is complete and that the net memory has stored therein the value of the net weight so that the next module can operate in view of the value in the net memory.

The control circuit also operates to send out the gross and tare weights for recording and/or memory purposes. The entire operation of the automatic subtraction device is substantially instantaneous in that it is accomplished within one or two seconds, depending upon the amount of gross weight. A protective circuit may be provided which would detect if the gross counters be set to 0 before the net counters reach 0 to thereby close the gate to the pulse oscillator and automatically reset all counters to 0 and prevent an improper result from being recorded.

It will be understood that modifications and variations may be effected without departing from the scope of the novel concepts of the present invention, but it is understood that this application is to be limited only by the scope of the appended claims.

The invention is hereby claimed as follows:

1. An automatic subtracting device adapted to receive a first decimal figure and a second decimal figure higher than the first figure and to subtract said first figure from said second figure, said device comprising, means for receiving and inverting said first figure to the 9-complement thereof, means for receiving and converting said inverted first figure into binary form, means for receiving and inverting said second figure to the 9-complement thereof, means for receiving and converting said inverted second figure into binary form, first and second binary counter means, means for receiving the output of said first figure converting means and presetting said first binary counter means with said first inverted and converted figure, means for receiving the output of said second figure converting means and presetting said second binary counter means with said second inverted and converted figure, means connected to the counter means for converting the figures in both said counter means from the 9-complement to the 10-complement, means connected to said counters for pulsing both said counter means simultaneously until said second counter means resets to zero thereby leaving the subtracted difference between said figures in said first counter means.

2. An automatic subtracting device adapted to receive a first decimal figure and a second decimal figure higher than the first figure and to subtract said first figure from said second figure, said device comprising, means for receiving and inverting said first figure to the 9-complement thereof, means for receiving and converting said inverted first figure into binary form, means for receiving and inverting said second figure to the 9-complement thereof, means for converting said inverted second figure into binary form, first and second binary counter means, means for receiving the output of said first figure converting means and presetting said first binary counter means with said first inverted and converted figure, means for receiving the output of said second figure converting means and presetting said second binary counter means with said second inverted and converted figure, first means connected to the counter means for pulsing both said counter means to convert the figures therein from the 9-complement to the 10-complement, second means for continuously and simultaneously pulsing both said counter means until said second counter means resets to zero thereby leaving the subtracted difference between said figure in said first counter means.

3. The combination as defined in claim 1, and means for receiving the output of said first counter means for reading out the subtracted difference.

4. The combination as defined in claim 1, and memory means for receiving and retaining the first figure for subsequent subtracting operations.

5. The combination as defined in claim 1, and memory means connected to said first counter means for receiving and retaining the subtracted difference value.

6. The combination as defined in claim 1, and memory means for receiving and retaining the first figure for subsequent subtracting operations, and memory means connected to said first counter means for receiving and retaining the subtracted difference value.

7. An automatic subtracting device adapted to receive a first decimal value and a second decimal value higher than said first value and to subtract said first value from said second value, said device comprising first means for receiving and substantially simultaneously inverting the first value to the 9-complement thereof and converting same into the BCD code, second means for receiving and substantially simultaneously inverting the second value to the 9-complement thereof and converting same into the BCD code, first and second counter means for respectively receiving the outputs of said first and second inverting and converting means, means connected to said counters for converting the values in said counter means, to the 10-complement, means connected to said counter means for pulsing said counter means simultaneously and said second counter means having means for stopping said pulsing means when the second counter means resets to zero thereby leaving the difference between the values in the first counter means.

8. An automatic subtracting device adapted to receive a first decimal value and a second decimal value higher than the first value and to subtract said first value from said second value, said device comprising, first inverting and converting means for receiving and inverting the first value to the 9-complement thereof and converting same into the BCD code, second inverting and converting means for receiving and inverting the second value to the 9-complement thereof and converting same into the BCD code, first and second counter means, a first presetter for receiving the output of said first inverting and converting means and presetting the first counter means with the inverted and converted value therefrom, a second presetter for receiving the output of said second inverting and converting means and presetting the second counter means with the inverted and converted value therefrom, means connected to said counter means for converting the values in said counter means to the 10-complement thereof by pulsing each counter means once, means connected to said counters for pulsing said counter means simultaneously, and means connected with said pulsing means and second counter means for stopping said pulsing means when said second counter means resets to zero.

9. An automatic subtracting device adapted to receive a first decimal figure and a second decimal figure higher than the first figure and to subtract said first figure from said second figure, said device comprising, means for receiving and converting said first figure into binary form, memory means connected to said converting means and receiving said first figure in binary form, converting said first figure to decimal form and retaining same for readout purposes, means connected to said memory means for inverting said first figure as received from said memory means into the 9-complement thereof, means receiving the output of said inverting means for converting said inverted first figure into binary form, means for inverting said second figure to the 9-complement thereof, means receiving the output of said second figure inverting means for converting said inverted second figure into binary form, first and second binary counter means, means connected to the output of said first figure converting means for presetting said first binary counter means with said first inverted and converted figure, means connected to the output of said second figure converting means for presetting said second binary counter with said second inverted and converted figure, means connected to said counter means for converting the figures in both said counter means from the 9-complement to the 10-complement, means connected to said counter means for continuously and simultaneously additively pulsing both said counter means, and means for stopping said pulsing means when said second counter means resets to zero thereby leaving the subtracted difference between said figures in said first counter means.

10. The combination as defined in claim 9, and memory means receiving the output of said first counter means, converting said output into decimal form and retaining same for readout purposes.

11. An automatic subtracting device having plural decade capacity adapted to receive a first decimal figure and a second decimal figure higher than the first figure and to subtract said first figure from said second figure, said device comprising, first and second inverting and converting matrixes for simultaneously inverting said respective first and second decimal figures to the 9-complement and converting same into the BCD code, first and second binary counters, first and second presetters, connected to and receiving the outputs of said first and second inverting and converting matrixes, placing the digits of each figure into the proper decade and forcing the counters into position according to the figures, first pulsing means connected to said counters for additively pulsing both counters once to convert the 9-complement figures to 10-complement figures, second pulsing means connected to said counters for additively and continuously pulsing both counters simultaneously, and means connected with said second counter and said second pulsing means for stopping said second pulsing means when said second counter resets to zero thereby leaving the subtracted difference between said figures in said first counter.

12. In combination with a weighing device, an automatic tare subtracting device for receiving in decimal form tare and gross weight figures and subtracting the tare weight figure from the gross weight figure to provide a net weight figure, said device comprising, tare inverting and converting means for inverting the tare weight to the 9-complement and converting same into the BCD code, gross inverting and converting means for inverting the gross weight to the 9-complement and converting same into the BCD code, net and gross binary counters, net and gross presetters converted respectively to said tare and gross inverting and converting means for receiving the outputs of the tare and gross inverting and converting means and respectively delivering same to the net and gross counters, first pulsing means connected to both said counters for additively pulsing both counters once to convert the 9-complement figures to 10-complement figures, second pulsing means connected to both said counters for additively and continuously pulsing both counters simultaneously, and means connected with said second pulsing means and said gross counter for stopping said second pulsing means when said gross counter resets to zero thereby leaving the net weight in said net counter.

13. The combination as defined in claim 12, and tare memory means connected to said tare inverting and converting means for retaining the tare weight for subsequent weighing operations involving the same tare weight.

14. The combination as defined in claim 12, and memory means connected to said net counter for retaining the net weight as read out from the net counter.

15. An automatic subtracting device having plural decade capacity adapted to receive a first decimal figure and a second decimal figure higher than the first figure and to subtract said first figure from said second figure, said device comprising, first and second inverting and converting matrixes for simultaneously inverting said respective first and second decimal figures to the 9-complement and converting same into the BCD code, first and second counters, each counter including a binary counter for each decade, first and second presetters connected respectively to said first and second inverting and converting matrixes for receiving the outputs of said first and second inverting and converting matrixes, placing the digits of each figure into the proper decade and respectively forcing the first and second counters into position according to the figures, first pulsing means connected to both said counters for additively pulsing the decade of the lowest order in both counters to convert the 9-complement figures to 10-complement figures, second pulsing means connected to both said counters for additively and continuously pulsing both counters simultaneously, and means connected with said second pulsing means and said second counter for stopping said second pulsing means when said second counter resets to zero thereby leaving the difference between said figures in said first counter.

16. The combination as defined in claim 15, and means connected to said counters for resetting both counters to zero if the first figure is greater than the second figure.

17. The combination as defined in claim 1, and means connected to said counters for resetting both counters to zero if the first figure is greater than the second figure.

18. An automatic subtracting device adapted to receive a first decimal figure and a second decimal figure higher than the first figure and to subtract said first figure from said second figure, said device comprising, means for inverting said first figure to the 9-complement thereof, means for converting said inverted first figure into binary form, means for inverting said second figure to the 9-complement thereof, means for converting said inverted second figure into binary form, first and second binary counter means, means connected to the output of said first figure inverting means for presetting said first binary counter means with said first inverted and converted figure, means connected to the output of said second figure inverting means for presetting said second binary counter means with said second inverted and converted figure, means connected to said counter means for pulsing both said counter means simultaneously, and means connected to said counter means and said pulsing means for stopping said pulsing means when said second counter means resets to zero thereby leaving the subtracted difference between said figures in said first counter means.

19. An automatic subtracting device having a four decade capacity adapted to receive a first decimal figure and a second decimal figure higher than said first decimal figure and to subtract said first figure from said second figure, said device comprising, means for converting said first figure into binary form, memory drivers for receiving the output of said converting means, memory means for receiving the output of said memory drivers and for converting the first figure into decimal form, first converting and inverting means for converting the output of said memory means into binary form and inverting same into the 9-complement, a first binary counter means for receiving the output of the first converting and inverting means and forcing said first counter with the count thereof, second converting and inverting means for converting the second decimal figure into binary form and inverting same into the 9-complement, a second binary counter, means for receiving the output of said second converting and inverting means and forcing said second counter with the count thereof, means for pulsing both counters once to convert the 9-complement figures to 10-complement figures, and means for pulsing both counters simultaneously until said second counter resets to zero thereby leaving the subtracted difference between said figures in said first counter.

20. The combination as defined in claim 19, wherein said memory drivers include four decade drivers and four digit drivers for each decade.

References Cited

UNITED STATES PATENTS 2,974,863  3/1961  Williams et al. _________ 235—151

FOREIGN PATENTS 1,333,300  6/1963  France.
1,339,686  9/1963  France.
1,012,297  12/1965  Great Britain.
1,011,401  12/1965  Great Britain.

MALCOLM A. MORRISON, *Primary Examiner.*

V. SIBER, *Assistant Examiner.*

UNITED STATES PATENT OFFICE
CERTIFICATE OF CORRECTION

Patent No. 3,375,357                                       March 26, 1968

Launcelot Dekker et al.

It is certified that error appears in the above identified patent and that said Letters Patent are hereby corrected as shown below:

Column 8, line 38, after "for" insert -- receiving and --.
Column 10, line 26, "converted" should read -- connected --.
Column 11, line 18, before "counter" insert -- second --.

Signed and sealed this 30th day of September 1969.

(SEAL)
Attest:

Edward M. Fletcher, Jr.                            WILLIAM E. SCHUYLER, JR.
Attesting Officer                                           Commissioner of Patents